Feb. 5, 1935.  W. E. LIPPERT  1,990,338
ELECTRIC INSECTICIDE
Filed July 30, 1932   2 Sheets-Sheet 1

INVENTOR
Walter E. Lippert
BY Ramsey & Kent
his ATTORNEYS

Feb. 5, 1935.    W. E. LIPPERT    1,990,338
ELECTRIC INSECTICIDE
Filed July 30, 1932    2 Sheets-Sheet 2

INVENTOR
Walter E. Lippert
BY
Ramsey & Kent
ATTORNEYS

Patented Feb. 5, 1935

1,990,338

UNITED STATES PATENT OFFICE 1,990,338

ELECTRIC INSECTICIDE

Walter E. Lippert, Hewlett, N. Y., assignor to Teco Manufacturing Corp., New York, N. Y., a corporation of New York Application July 30, 1932, Serial No. 626,735

3 Claims. (Cl. 219—19)

This invention relates to electrical insecticide and more particularly to electrical insecticides especially useful in connection with the exterminating of all types and stages of moth life.

An object of the present invention is to provide a new, simple, and efficient insecticide electrically energized for use in connection with exterminating insects of various types.

Another object of the invention is to provide in an insecticide of the character before set forth improved heating arrangements for heating the container itself and thereby expediting the formation of insect exterminating fumes by more rapid heating of the chemicals positioned in the container.

Another object of the invention is to provide within the container means for aiding in the dissipation of fumes therefrom.

A further object of the invention is to provide a part of the container with such shape that an increased effective heating area is produced.

A still further object of the invention is to provide, in connection with the outlet for fumes from the container, simple and efficient closing means for preventing the escape of fumes from the container when the same is not in use.

In the present invention, the insecticide consists briefly of a pair of metallic shell members, which members are termed respectively upper and lower shell members so threaded as to be capable of being secured together and disengaged from each other. The lower shell member, in which the chemicals used in destroying insect life are to be positioned, has its outer surface or wall indented at spaced intervals therearound to constitute in effect an increase in area of such wall. The upper shell member is provided with an annular bead immediately above the fluted portion thereof in which bead is positioned an electrical heating element of well known type. This heating element is retained in the bead by means of a metallic strip which serves to close a part of the opening formed by the bead. In connection with the heating element seated in the bead or recess formed thereby, use is made of an additional heating element positioned against the interior wall of the shell, and at one side only thereof. The purpose of such additional heating element is to create in effect a forced draft which will positively expel the fumes, liberated from chemicals in the bottom shell member, through openings in the top of the upper shell member. These openings are spaced equi-distantly around the top and associated with the top of the upper shell member is a closure member provided with openings corresponding to those in the top of the shell, which openings can be moved into register with those in the shell and moved out of register therewith to close such openings.

Other objects, features, and advantages of the present invention will become apparent by reference to the following detail description read in the light of the accompanying drawings wherein Fig. 1 is a vertical section of a device embodying the invention.

Figure 1:
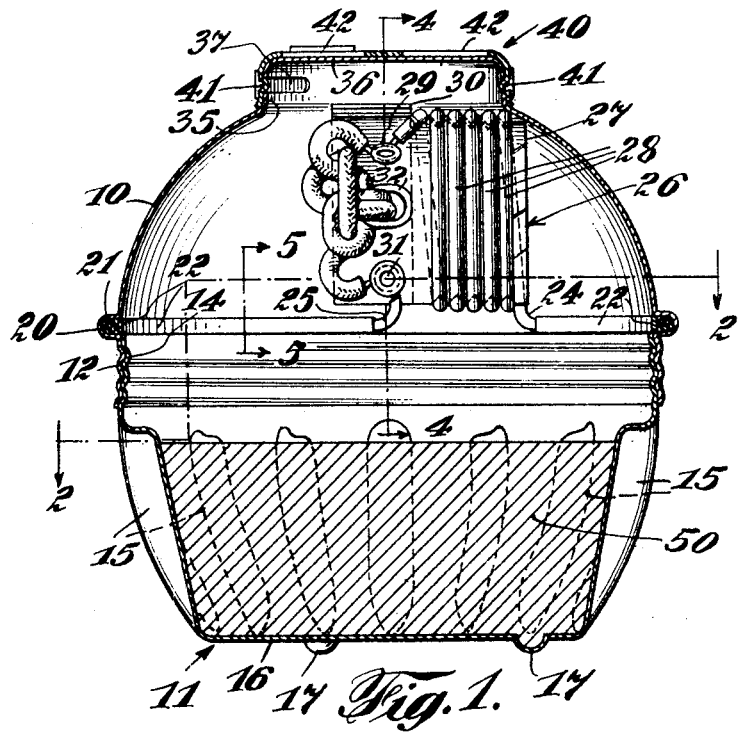
Figure 2:
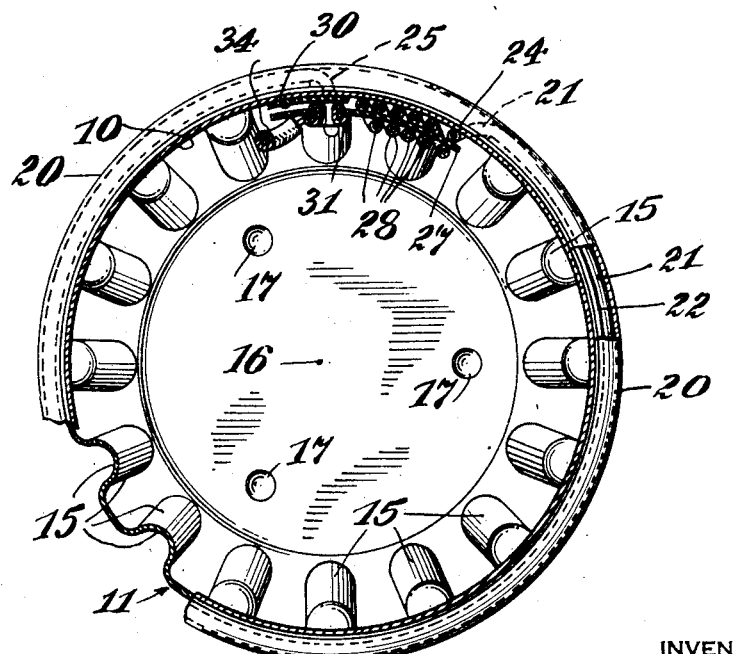
Fig. 2 is a section taken substantially on the lines 2—2 of Fig. 1.

Referring now to the drawings, the device illustrated therein, which may be considered the preferred form of the invention, consists of an upper metallic shell 10 and a lower metallic shell 11. The upper shell 10 is provided with threads 12 for engagement with corresponding threads 14 with which the lower shell is provided.

The side wall of the lower shell 11 is provided with a number of indentations or flutes 15 extending from just below the threaded portion 14 to the bottom 16 which may be flat or which may be given any configuration desired. The bottom part 16 is provided with detents 17 pressed therefrom which serve the purpose of supporting legs to elevate the bottom from a surface on which the device may rest.

The upper shell 10 is provided with an annular bead 20, which bead forms an annular recess in part of which is located an electrical heating element 21 of any desired type. Preferably, this heating element 21 consists of nichrome wire covered with insulating material. The recess is closed by means of a metallic strip 22 which may be welded or otherwise secured in place and which in turn serves to hold the heating element 21 within its proper recess. As shown in Fig. 1, the heating element 21 is not positioned within the entire recess formed by the bead 20 since the ends of this heating element as indicated at 24 and 25 are spaced a short distance apart. The purpose of such spacing is to permit the inclusion within the upper shell of an ancillary heating element designated generally at 26. This ancillary heating element consists in its simplest and preferred form of a continuation of the nichrome wire used in the element 21, which wire with its insulating cover is coiled around a strip 27 of insulating material into a number of turns. These turns are indicated in the various figures of the drawings by the reference character 28. It will thus be seen from inspection of the drawings that the end 24 of the heating element 21 continues around the strip 27 to form the turns 28 and terminates at a terminal 29 which is in the nature of an eyelet riveted to the strip 27. A supplementary strip of insulating material 30 is positioned between the eyelet 29 and the wall of the container to prevent shorting of contact or terminal 29. The other end 25 of element 21 terminates at a terminal 31 similar to the terminal 29 and insulated from the shell by the same strip of insulating material 30. The two strips 27 and 30 are secured to the wall of the shell by means of an eyelet 32 which also serves as an opening through which electrical conductors 34 may pass. The ends of the two conductors 34 are secured to the respective terminals 29 and 31.

Figure 3:
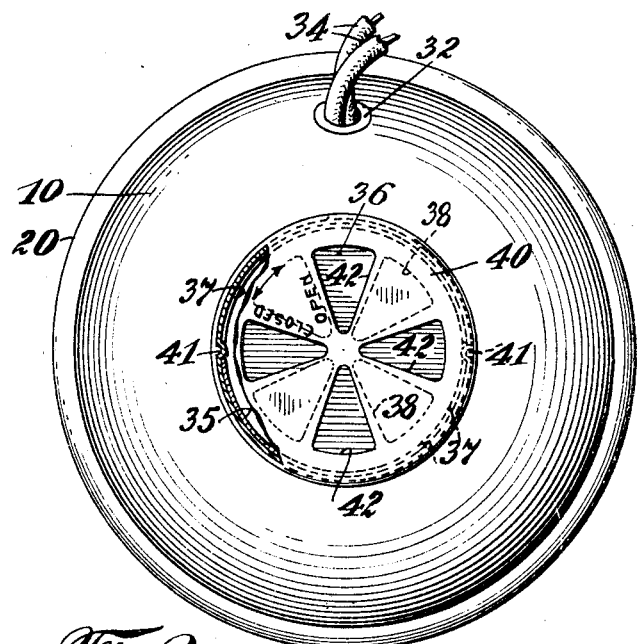
Fig. 3 is a plan view of the device showing the control fume outlets therein.
Figures 4, 5:
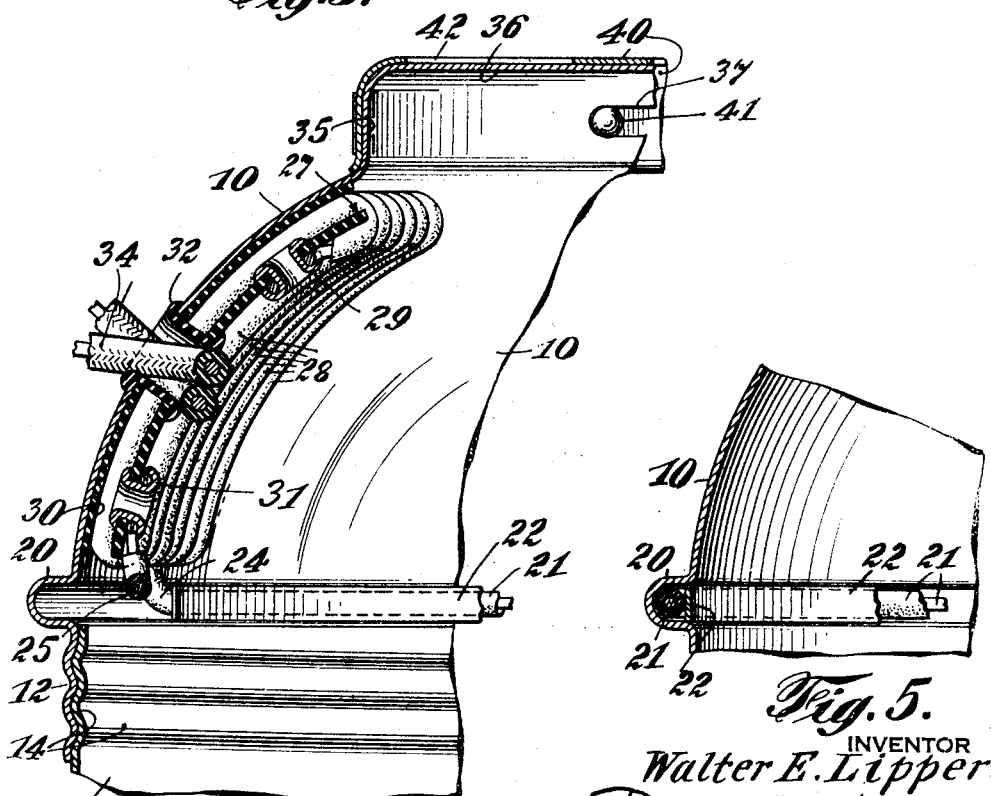
Fig. 4 is an enlarged section taken substantially on the lines 4—4 of Fig. 1 and showing the arrangement of a part of the heating mechanism therefor and Fig. 5 is an enlarged section taken substantially on lines 5—5 of Fig. 1.

The upper shell 10 is provided with a neck portion 35 and a substantially flat top portion 36. The neck portion 35 is provided with a pair of oppositely disposed slots 37 while the top portion 36 is provided with a plurality of substantially V-shaped openings 38 indicated in dotted lines in Fig. 3. A cover member 40 corresponding in shape to the neck portion 35 and top 36 of the shell fits around these parts of the upper shell and is held thereon by means of oppositely disposed detents 41 pressed from the material of the cover to engage within the slots 37. This cover member 40 is provided with a number of openings 42 corresponding in shape and number to the openings 38 in the top of the shell. The outer neck portion of the cover 40 may be knurled or not as desired to provide a good purchase for permitting the turning of the cover relative to the top of the shell.

Positioned in the lower shell 11 is a cake of chemicals (indicated by section lines in Fig. 1), which cake of chemicals is shaped to fit the shape of the lower shell so that there is intimate contact between the inner surface of the side wall of the lower shell and of the cake, whereby efficient transfer of heat from the shell to the cake is accomplished. By experimentation, it has been found that paradichlorobenzene may be employed in connection with a device of this kind with good results. It is well known that the fumes from this substance when concentrated properly are fatal to moth life of every stage and character. Hence, this chemical in combination with the device of the invention serve admirably to exterminate all types of moth life.

The operation and use of the device are substantially as follows:

A cake of chemicals 50 is positioned in the lower shell member and then the upper shell member is secured to the lower by engaging the corresponding threads 12 and 14. In this condition, the device is ready for energization. Current to energize the heating elements is supplied from any convenient source through the conductors 34 to the respective ends of the continuous nichrome wire. Energization of this nichrome wire or heating element causes the generation of heat, part of which is generated within the annular recess formed by the bead 20 with the result that the upper shell becomes heated. The heat from the upper shell is transmitted by conduction directly to the lower shell so that the entire body thereof becomes heated. As this lower shell becomes heated, the paradichlorobenzene (which is normally in flake or cake form) becomes first liquefied and then as the heating continues, fumes are liberated. In this connection, the ancillary heating element 26 serves a very useful purpose. Since the openings 42 and 38 are moved into register when the device is put in use, the fumes are free to pass through the matched openings, but it has been found advantageous to increase the passage of fumes from the shells. This additional heating element being positioned at one side of the upper shell, serves to impart added heat to the fumes as they are liberated, forcing them upwardly thereby, and out through the matched openings closest to the heating element. As this, in effect, draft is created, it is possible that some air will be drawn into the container through other openings so that an efficient circulation and consequent dispersion of fumes result.

With the device placed in a closed compartment of any desired character such as, for example, a clothes closet, fumes will be liberated rapidly and will permeate all articles of clothing within the compartment in a relatively short time. These fumes so collected and concentrated serve to completely exterminate all forms of moth life.

When the device is not in use, the cover member 40 is moved to position in which the openings therein are out of register with the openings 38. The limits of movement of the cover member are, of course, determined by the dimensions of the two slots 37. When these openings are out of register, the cover member serves to efficiently retain any fumes which are given off by the chemical under normal conditions, thereby adding to the life of the chemical.

From the foregoing, it will be seen that the present invention contains novel features not found in any devices of this character heretofore used. For example, the positioning of the main heating element within an annular bead of one of the shell members insures that the materials of which the shells are composed (good heat conducting material) will be most efficiently heated with the result that the chemicals therein will be heated more rapidly. Another advantage of the present device resides in having the side wall of the lower element fluted so that an increased area of contact between the heated material of the shell and the chemical is produced. This insures rapid liquefication of the article with resultant generation of fumes. The arrangement at the top of the upper shell whereby the shells can be sealed against the atmosphere when the device is not in use adds to the life of the chemicals as before explained. Furthermore, the provision of the ancillary heating element on the inside of the upper shell against a part of the wall thereof aids in the dispersion of the generated fumes as well as it aids in the heating of the materials of the shell. While this ancillary heating element has been shown (in the preferred form) as being a continuation of the main heating element embedded in the annular recess, it will be evident that an entirely separate heating element could be employed.

Since the present invention provides a device for use in connection with the extermination of insect life, which device is of the utmost simplicity, yet possesses great efficiency, it is to be understood that the invention is not to be limited by the illustrated embodiment of the preferred form, but is to be limited only by the scope of the following claims.

What I claim is:—

1. A device of the character described comprising upper and lower shell members, the wall of said upper shell member being provided with an annular recess forming a peripheral bead, a heating element positioned in said recess, and a second heating element positioned within said upper shell member with substantially the entire area of the heating element adjacent a relatively small section of the side wall thereof and above said recess.

2. A device of the character described comprising a metallic lower shell member, a metallic upper shell member having openings in the top thereof and being removably secured to said lower shell member, means secured within the side wall of one of said shell members for heating said shell members, a heating element separate from said means within said upper shell member and having substantially the entire area of the heating element adjacent a relatively small section of the side wall thereof for heating generated fumes to drive said fumes through said openings.

3. A device of the character described comprising upper and lower shell members, the wall of said upper shell member being provided with an annular recess forming a peripheral bead, a heating element positioned in said recess, a second heating element positioned within said upper shell member with substantially the entire area of the heating element adjacent a relatively small section of the side wall thereof and above said recess, and an insulating member between said second element and the side wall of said shell member.

WALTER E. LIPPERT.